(12) United States Patent
Ochi (10) Patent No.: US 12,354,764 B2
(45) Date of Patent: Jul. 8, 2025

(54) SILVER POWDER, METHOD FOR PRODUCING SAME, AND CONDUCTIVE RESIN COMPOSITION

(71) Applicant: Mitsui Mining & Smelting Co., Ltd., Tokyo (JP)

(72) Inventor: Kentaro Ochi, Takehara (JP)

(73) Assignee: MITSUI MINING & SMELTING CO., LTD. (JP)

( * ) Notice: Subject to any disclaimer, the term of this patent is extended or adjusted under 35 U.S.C. 154(b) by 0 days.

(21) Appl. No.: 18/022,883

(22) PCT Filed: Sep. 15, 2021

(86) PCT No.: PCT/JP2021/033848
§ 371 (c)(1),
(2) Date: Feb. 23, 2023

(87) PCT Pub. No.: WO2022/075021
PCT Pub. Date: Apr. 14, 2022

(65) Prior Publication Data
US 2023/0360820 A1    Nov. 9, 2023

(30) Foreign Application Priority Data
Oct. 5, 2020    (JP) .................................. 2020-168775

(51) Int. Cl.
*H01B 1/22*    (2006.01)
*B22F 1/054*    (2022.01)
(Continued)

(52) U.S. Cl.
CPC ............. *H01B 1/22* (2013.01); *B22F 1/0553* (2022.01); *B22F 1/056* (2022.01); *B22F 1/10* (2022.01);
(Continued)

(58) Field of Classification Search
CPC ....................................................... H01B 1/22
See application file for complete search history.

(56) References Cited

U.S. PATENT DOCUMENTS

| 4,637,865 A | 1/1987 | Sergent et al. |
| 2007/0207335 A1 | 9/2007 | Karandikar et al. |

(Continued)

FOREIGN PATENT DOCUMENTS

| CN | 105908220 A | 8/2016 |
| JP | 2005146387 A | 6/2005 |

(Continued)

OTHER PUBLICATIONS

International Search Report (English and Japanese) issued in PCT/JP2021/033848, mailed Nov. 30, 2021; ISA/JP (7 pages).

(Continued)

*Primary Examiner* — William D Young
(74) *Attorney, Agent, or Firm* — Harness, Dickey & Pierce, P.L.C.

(57) ABSTRACT

A silver powder containing dendrite silver particles is provided. The dendrite silver particles are in a dendrite shape having one trunk and a plurality of branches branching from the trunk. The thickness of the trunk of the dendrite silver particles is from 10 to 280 nm. The number of the branches per length of the trunk is from 6 to 30 branches/μm. The percentage by number of the dendrite silver particles in the whole of silver particles is 50 N % or more. This silver powder is produced by reducing silver ions through electrolysis of an electrolyte solution containing silver ions and hydantoin or a derivative thereof.

9 Claims, 5 Drawing Sheets

Example 1

(51) Int. Cl.
*B22F 1/10* (2022.01)
*C08K 3/08* (2006.01)
*C25C 1/20* (2006.01)

(52) U.S. Cl.
CPC ............ *C08K 3/08* (2013.01); *C25C 1/20* (2013.01); *B22F 2301/255* (2013.01); *B22F 2304/054* (2013.01); *B22F 2999/00* (2013.01); *C08K 2003/0806* (2013.01); *C08K 2201/001* (2013.01); *C08K 2201/003* (2013.01); *C08K 2201/011* (2013.01)

(56) References Cited

U.S. PATENT DOCUMENTS

2017/0120394 A1    5/2017    Shingai et al.
2018/0230287 A1*   8/2018    Shiozawa ............... H01B 5/14
2018/0326478 A1*   11/2018   Morinaka ............... H01B 1/02
2020/0130066 A1*   4/2020    Zhao ..................... C30B 29/02

FOREIGN PATENT DOCUMENTS

| | | |
|---|---|---|
| JP | 2009526132 A | 7/2009 |
| JP | 2013144829 A | 7/2013 |
| JP | 201771819 A | 4/2017 |
| JP | 2017071824 A | 4/2017 |
| WO | 2015190076 A1 | 12/2015 |
| WO | 2017094361 A1 | 6/2017 |

OTHER PUBLICATIONS

Kona Powder and Particle Journal, Jan. 10, 2020, No. 37, 166-175 p. 168, right column line 14 to p. 169, left column, line 16, fig. 3 (11 pages).

* cited by examiner

Fig. 1

Example 1

Fig. 2

Example 2

Fig. 3

Example 3

Fig. 4

Comparative Example 1

Fig. 5

SILVER POWDER, METHOD FOR PRODUCING SAME, AND CONDUCTIVE RESIN COMPOSITION

CROSS REFERENCE TO RELATED APPLICATIONS

This application is a U.S. National Phase Application under 35 U.S.C. 371 of International Application No. PCT/JP2021/033848, filed on Sep. 15, 2021, which claims priority to Japanese Patent Application No. 2020-168775, filed on Oct. 5, 2020. The entire disclosures of the above applications are expressly incorporated by reference herein.

BACKGROUND

Technical Field

The present invention relates to a silver powder and a method for producing the same. The present invention also relates to a conductive resin composition containing the silver powder.

Related Art

Recently, attempts have been made to produce conductive resin compositions by mixing silver powders with resins. For example, US 2018/326478A1 describes a silver powder containing dendrite silver particles, in which D50N/D50D is from 1.0 to 10.0, and D50D is from 1.0 to 15.0 μm, where D50D represents the volume cumulative particle diameter as measured after irradiation of ultrasonic waves, and D50N represents the volume cumulative particle diameter as measured without irradiation of ultrasonic waves. US 2018/326478A1 states that this silver powder can impart sufficient conductivity to a resin by mixing it with the resin.

For example, JP 2017-71819A describes dendrite silver particles having an average particle size (D50) of 0.5 to 50 μm and a BET specific surface area of 0.2 to 4.5 $m^2/g$, in which silver particles grow between branches into a flat plate shape. JP 2017-71819A states that this silver powder can impart.

Regarding the silver powder described in US 2018/326478A1, dendrite silver particles constituting the silver powder are uniformly dispersed in a resin, and thus in a case where a film is prepared from the resin containing the silver powder, its conductivity is unlikely to change advantageously even when it is stretched.

The silver powder described in JP 2017-71819A has a high bulk density because branches of dendrite silver particles constituting the silver powder are joined together.

Incidentally, silver powders that are to be added to a resin to impart conductivity to the resin are required to impart high conductivity even when the amount of silver powders added is small. In US 2018/326478A1 and JP 2017-71819A, no research has been conducted from this point of view.

Accordingly, it is an object of the present invention to provide a silver powder capable of imparting high conductivity to a resin even when the amount of silver powder added thereto is small.

SUMMARY

The present invention provides a silver powder containing dendrite silver particles in a dendrite shape having one trunk and a plurality of branches branching from the trunk, in which a thickness of the trunk is from 10 to 280 nm, the number of the branches per length of the trunk is from 6 to 30 branches/μm, and the percentage by number of the dendrite silver particles in the whole of the silver particles is 50 N % or more.

The present invention further provides a conductive resin composition containing a resin and the above-described silver powder.

The present invention further provides a method for producing a silver powder, including a step of reducing silver ions through electrolysis of an electrolyte solution containing silver ions and hydantoin or a derivative thereof.

DETAILED DESCRIPTION

The present invention will be described below based on a preferred embodiment thereof with reference to the drawings. The silver powder of the present invention is a group of silver particles. The silver powder of the present invention is constituted by elemental silver and unavoidable impurities. One of the characteristics of the silver powder of the present invention is the morphology of the silver particles constituting the silver powder. Specifically, the silver particles have a dendrite shape. Dendrite means a shape having one trunk and a plurality of branches branching from the trunk.

Although depending on the production method and production conditions of the silver powder, the branches of the dendrite silver particles in the present invention extend substantially at a constant angle with respect to the trunk, and, for example, the branches may be in a single plane containing the trunk. Specifically, the branches may substantially axisymmetrically extend in a plane containing the trunk serving as the axis of symmetry. Alternatively, the dendrite silver particles may have a morphology in which the trunk is along the line of intersection of two or more planes and the branches are in the two or more planes. Alternatively, the dendrite silver particles may have a morphology in which the branches radially extend from any position around the trunk as the axis at a constant angle with respect to the trunk. In any morphology, it is preferable that adjacent branches should be at a distance from each other with substantially no joints between branches.

Silver powders constituted by dendrite silver particles are conventionally known in the art as described in US 2018/326478A1, for example. On the other hand, the silver powder of the present invention is extremely novel in that the morphology of the dendrite silver particles is significantly different from those conventionally known.

Specifically, the silver particles constituting the silver powder of the present invention are such that the trunk in the dendrite shape thereof is thinner than that of conventionally known dendrite silver particles. Specifically, the thickness of the trunk is preferably 280 nm or less, more preferably 250 nm or less, and even more preferably 200 nm or less. When the trunk of the dendrite silver particles is thin, relatively more branches are developed, and contact between silver particles is more likely to occur. As a result, it is possible to realize the same level of conductivity as in conventional cases even when the amount of the silver powder of the present invention added to a resin is smaller than in conventional cases, for example. From this point of view, the thinner the trunk of the dendrite silver particles, the more preferable; however, if the trunk is excessively thin, it is difficult for the particles to maintain the dendrite shape. From this point of view, the thickness of the trunk is preferably 10 nm or more, more preferably 30 nm or more, and even more preferably 50 nm or more.

From these points of view, the thickness of the trunk of the dendrite silver particles is preferably from 10 to 280 nm, more preferably from 30 to 250 nm, and even more preferably from 50 to 200 nm.

While the thickness of the trunk of the dendrite silver particles is as described above, the length of the trunk is preferably from 0.5 to 10.0 µm, more preferably from 0.7 to 8.0 µm, and even more preferably from 1.0 to 5.0 µm. When the length of the trunk of the dendrite silver particles is within this range in combination with the thickness of the trunk within the aforementioned range, contact between silver particles is more likely to occur. The methods for measuring the thickness and the length of the trunk will be explained in "Examples" below.

The silver particles constituting the silver powder of the present invention are also characterized in that the number of the branches branching from the trunk in the dendrite shape is large. Specifically, the number of the branches per length of the trunk is preferably 6 branches/µm or more, more preferably 8 branches/µm or more, and even more preferably 10 branches/µm or more. Thus, the dendrite silver particles constituting the silver powder of the present invention have a structure in which the number of the branches per unit length of the trunk is very large. When the number of the branches per unit length of the trunk is increased, contact between dendrite silver particles is more likely to occur. As a result, it is possible to realize the same level of conductivity as in conventional cases even when the amount of the silver powder of the present invention added to a resin is smaller than in conventional cases, for example. From this point of view, the larger the number of the branches, the more preferable; however, if the number of the branches is excessively large, the branches are too close to each other, and the advantage of the dendrite shape is decreased. From this point of view, the number of the branches is preferably 30 branches/µm or less, more preferably 27 branches/µm or less, and even more preferably 24 branches/µm or less.

From these points of view, the number of the branches per length of the trunk is preferably from 6 to 30 branches/µm, more preferably from 8 to 27 branches/µm, and even more preferably from 10 to 24 branches/µm. The method for measuring the number of the branches will be explained in "Examples" below.

The average length of the longest branch among the branches extending from the trunk is preferably from 0.2 to 5.0 µm, more preferably from 0.3 to 4.0 µm, and even more preferably from 0.4 to 3.0 µm. When the length of the branches of the dendrite silver particles is within this range in combination with the number of the branches within the aforementioned range, contact between silver particles is more likely to occur.

The method for measuring the length of the longest branch among the branches extending from the trunk will be explained in "Examples" below.

The silver powder of the present invention sufficiently exhibits desired effects of the present invention, when 50 N % or more of silver particles in the whole of the silver particles are dendrite silver particles having a trunk with a thickness of 10 to 280 nm and a number of branches per length of the trunk of 6 to 30 branches/µm. The percentage of the dendrite silver particles that fall within such dimensional ranges is preferably 60 N % or more, and more preferably 70 N % or more.

In order to determine the percentage of the above-described dendrite silver particles, it is preferable to carry out measurement on 50 or more silver particles as the whole silver particles.

The silver powder of the present invention is very bulky because it is constituted by dendrite silver particles having a trunk with a predetermined thickness and a sufficient number of branches. The bulkiness of silver powder can be expressed in terms of tap density, and the tap density of the silver powder of the present invention is preferably 1.0 g/cm$^3$ or less, more preferably 0.8 g/cm$^3$ or less, and even more preferably 0.7 g/cm$^3$ or less. The low tap density of the silver powder of the present invention is advantageous because it is possible to realize the same level of conductivity as in conventional cases even when the amount of the silver powder added to a resin is smaller in conventional cases, for example. The lower limit of the tap density is about 0.4 g/cm$^3$. The method for measuring the tap density will be explained in "Examples" below.

In relation to the tap density described above, the silver powder of the present invention also has a low apparent density. Specifically, the apparent density of the silver powder of the present invention is preferably from 0.2 to 0.7 g/cm$^3$, more preferably from 0.25 to 0.65 g/cm$^3$, and even more preferably from 0.3 to 0.6 g/cm$^3$. The apparent density of the silver powder of the present invention within this range also makes it possible to realize the same level of conductivity as in conventional cases even when the amount of the silver powder added to a resin is smaller in conventional cases, for example. The method for measuring the apparent density will be explained in "Examples" below.

The 50th percentile particle size $D_{50}$ of the silver powder of the present invention in the volume-weighted particle size distribution as measured using the laser diffraction scattering method is preferably from 0.5 to 3.0 µm, more preferably from 0.6 to 2.5 µm, and even more preferably from 0.7 to 2.0 µm. When the particle size $D_{50}$ of the silver powder is within this range, contact between silver particles is more likely to occur. The method for measuring the particle size $D_{50}$ will be explained in "Examples" below.

The BET specific surface area of the silver powder of the present invention is preferably from 2.0 to 5.0 m$^2$/g, more preferably from 2.4 to 4.5 m$^2$/g, and even more preferably from 2.8 to 4.0 m$^2$/g. When the BET specific surface area of the silver powder is within this range, contact between silver particles is more likely to occur. The method for measuring the BET specific surface area will be explained in "Examples" below.

The silver powder of the present invention is characterized by a smaller silver crystallite size in silver particles than that of conventional silver powders having a similar particle size. Specifically, the silver crystallite size is preferably 50 nm or less, more preferably 46 nm or less, and even more preferably 42 nm or less. A small silver crystallite size means that the silver powder of the present invention has a low shrinkage onset temperature when sintered. In other words, when compared at the same sintering temperature, the silver powder of the present invention has a larger shrinkage rate than that of conventional silver powders having a similar particle size. From this point of view, the smaller the silver crystallite size, the more preferable; however, when the crystallite size is as small as about 10 nm, the shrinkage onset temperature is sufficiently low.

From these points of view, the silver crystallite size of the silver powder of the present invention is preferably from 10 to 50 nm, more preferably from 20 to 46 nm, and even more preferably from 30 to 42 nm. The method for measuring the silver crystallite size will be explained in "Examples" below.

In relation to the silver crystallite size, the shrinkage rate of the silver powder of the present invention at 150° C. is preferably 0.3% or more, more preferably 0.5% or more, and even more preferably 0.7% or more. Considering that the melting point of bulk silver is 961.8° C., such a shrinkage rate of the silver powder of the present invention at 150° C. is extremely advantageous in view of low-temperature sintering. From this point of view, the higher the shrinkage rate of the silver powder at 150° C., the more preferable; however, when the shrinkage rate is as high as about 0.3%, the benefits of low-temperature sintering can be sufficiently obtained. The shrinkage rate of the silver powder is measured through thermo-mechanical analysis. The measuring method will be explained in "Examples" below.

In the dendrite silver particles constituting the silver powder of the present invention, the branches are at a constant angle with respect to the trunk, as described above. The average angle between the trunk and each branch on the acute side is preferably from 30 to 80 degrees, more preferably from 40 to 75 degrees, and even more preferably from 50 to 70 degrees. When the angle between the trunk and each branch is within this range, contact between dendrite silver particles is more likely to occur.

The method for measuring the average angle will be explained in "Examples" below.

In the silver powder of the present invention, it is preferable that the branches branching from the trunk of the dendrite silver particles constituting the silver powder should have a plurality of sub-branches branching from the branches. When the dendrite silver particles have not only branches but also sub-branches, contact between dendrite silver particles is more likely to occur. As a result, it is possible to realize the same level of conductivity as in conventional cases even when the amount of the silver powder of the present invention added to a resin is smaller than in conventional cases, for example.

The sub-branches extend substantially at a constant angle with respect to a branch, and for example, the sub-branches may be in a single plane containing the branch. Specifically, the sub-branches may substantially axisymmetrically extend in a plane containing the branch serving as the axis of symmetry. Alternatively, the dendrite silver particles may have a morphology in which the branch is along the line of intersection of two or more planes and the sub-branches are in the two or more planes. Alternatively, the dendrite silver particles may have a morphology in which the sub-branches radially extend from any position around the branch as the axis at a constant angle with respect to the axis.

Since the sub-branches are finer than the branches, adjacent sub-branches may be joined to each other in some cases; however, in view of decreasing the bulk density of the silver powder, it is preferable that adjacent sub-branches should be at a distance from each other.

Next, a preferred method for producing the silver powder of the present invention will be described. The silver powder of the present invention is preferably produced by reducing silver ions into silver through electrolysis of an electrolyte solution containing silver ions. In the process of producing a silver powder through electrolysis, an anode and a cathode are immersed in the electrolyte solution containing silver ions, and a DC voltage is applied between the two electrodes. Silver generated through reduction by electrolysis is deposited on the cathode.

Known insoluble anode plates (DSE (manufactured by Permelec Electrode Ltd.)) may be used as the anode for use in the electrolysis. Preferred examples of the insoluble anode plates include titanium electrodes coated with iridium oxide and titanium electrodes coated with ruthenium oxide. There is no particular limitation on the type of cathode, and materials that do not affect the reduction of silver ions may be selected for the cathode as appropriate. Examples of thereof include stainless steel.

As for electrolysis conditions, the current density is preferably from 10 to 2000 $A/m^2$, more preferably from 30 to 1500 $A/m^2$, and even more preferably from 50 to 1000 $A/m^2$. When the current density is 10 $A/m^2$ or more, the silver deposition rate can be increased, and coarsening of the dendrite silver particles can be suppressed. When the current density is 2000 $A/m^2$ or less, temperature rise in the electrolyte solution can be suppressed, and the shape of the dendrite silver particles can be stabilized.

The temperature of the electrolyte solution is preferably 80° C. or less, more preferably 60° C. or less, and even more preferably 40° C. or less. When the temperature of the electrolyte solution is 80° C. or less, excessive convection of the electrolyte solution can be suppressed, which results in avoidance of the difficulty in controlling the dendrite shape caused by an excessive increase in the rate of feeding silver ions.

In view of successfully obtaining silver particles with a desired dendrite shape, it is advantageous to circulate the electrolyte solution during electrolysis. To circulate the electrolyte solution, an electrolyzer including a closed flow channel, an electrolytic bath placed in the flow channel, and a pump placed in the flow channel may be used, for example, in which the pump is driven to allow the electrolyte solution to flow in one direction through the electrolytic bath. The anode and the cathode for use in the electrolysis may be immersed in the electrolytic bath so as to face each other.

In a case where electrolysis is performed while circulating the electrolyte solution, it is advantageous to adjust the flow rate, that is, the circulation speed of the electrolyte solution, in view of successfully obtaining silver particles with a desired dendrite shape. Specifically, the circulation speed of the electrolyte solution is preferably from 0.1 to 30.0 mL/(min·cm²), more preferably from 0.2 to 20.0 mL/(min·cm²), and even more preferably from 0.3 to 10.0 mL/(min·cm²). The circulation speed can be obtained by dividing the flow rate (mL/min) of the electrolyte solution by the current flowing area (cm²) of the cathode.

The electrolyte solution for use in the electrolysis contains a silver compound serving as a silver ion source. For example, water-soluble silver salts such as silver nitrate are preferably used as the silver compound. The concentration of silver ions in the electrolyte solution is preferably from 0.1 to 50 g/L, more preferably from 0.5 to 30 g/L, and even more preferably from 1.0 to 20 g/L. When the concentration of silver ions is 0.1 g/L or more, the silver deposition rate can be increased to an industrially satisfactory level. When the silver deposition rate is 50 g/L or less, silver particles with a desired dendrite shape can be successfully obtained.

The electrolyte solution preferably contains a supporting salt for the purpose of increasing the ion conductivity. As the supporting salt, a water-soluble salt that does not affect the electrolysis can be used. In particular, it is preferable to use ammonium sulfate as the supporting salt. With ammonium sulfate, the pH of the electrolyte solution is easily adjusted within a range where dissolution of the deposited silver particles is unlikely to occur, and thus silver particles with a desired dendrite shape can be successfully obtained. Specifically the pH of the electrolyte solution is preferably from 6 to 10. The concentration of the supporting salt in the electrolyte solution is preferably set such that the pH of the electrolyte solution is within this range, and specifically, the concentration of the supporting salt is preferably from 10 to 100 g/L, more preferably from 20 to 80 g/L, and even more preferably from 30 to 60 g/L.

It is preferable that the electrolyte solution should further contain hydantoin or a derivative thereof (hereinafter collectively referred to as "hydantoin compound"). It seems that a hydantoin compound forms an associate with silver ions in the electrolyte solution. When electrolysis is performed in a condition that such an associate is formed, silver particles with a desired dendrite shape can be successfully obtained.

Examples of the hydantoin compound include hydantoin, and alkyl derivatives, hydroxyalkyl derivatives, phenyl derivatives, amino derivatives, carboxyalkyl derivatives, and halogen derivatives of hydantoin. Specific examples thereof include 1-methylhydantoin, 5-methylhydantoin, 5-ethylhydantoin, 1,3-dimethylhydantoin, 5,5-dimethylhydantoin, 5,5-diphenylhydantoin, 1-hydroxymethyl-5,5-dimethylhydantoin, 1,3-dihydroxymethyl-5,5-dimethylhydantoin, 1,5,5-trimethylhydantoin, 1-aminohydantoin, 5-carboxymethylhydantoin, hydroxymethylhydantoin, diiodohydantoin, 1-bromo-3-chloro-5,5-dimethylhydantoin, and 3-(chloromethyl)-5,5-diphenylhydantoin. These hydantoin compounds may be used singly or in a combination of two or more.

The concentration of the hydantoin compound in the electrolyte solution is preferably from 0.01 to 10.0 g/L, more preferably from 0.03 to 5.0 g/L, and even more preferably from 0.1 to 3.0 g/L. When the concentration of the hydantoin compound in the electrolyte solution is within this range, silver particles with a desired dendrite shape can be successfully obtained.

When electrolysis is performed under the above-described conditions, dendrite silver particles are deposited on the cathode. The deposited dendrite silver particles are collected by scraping them off the cathode, thereby obtaining the desired silver powder. The silver particles constituting the silver powder obtained in this manner have a dendrite shape, and thus this silver powder can impart conductivity to a resin even when the amount of the silver powder added thereto is smaller, compared to a silver powder constituted by spherical silver particles, for example.

An organic surface treatment agent may be applied to the silver powder obtained through electrolysis. In a case where an organic surface treatment agent is applied to the silver powder, aggregation of the silver particles can be suppressed. It is also possible to control the affinity with other materials by selecting the organic surface treatment agent appropriately. Examples of the organic surface treatment agent include saturated fatty acid, unsaturated fatty acid, nitrogen-containing organic compounds, sulfur-containing organic compounds, and silane coupling agents.

In the thus obtained silver powder, contact between silver particles constituting the silver powder is likely to occur, and accordingly, the silver powder easily imparts high conductivity to a resin when the silver powder is added to the resin. For example, the silver powder of the present invention is suitably used in the form of a conductive resin composition containing the silver powder and a resin. For example, the silver powder of the present invention can be mixed with a resin, an organic solvent, glass frit, and others to form conductive paste. Alternatively, the silver powder of the present invention can be mixed with an organic solvent and others to form conductive ink. The thus obtained conductive paste or conductive ink can be applied to the surface of a target object to obtain a conductive film with a desired pattern.

EXAMPLES

Hereinafter, the present invention will be described in more detail by means of the following examples. However, the scope of the invention is not limited to these examples. Unless otherwise specified, "%" means "% by mass".

Example 1

(1) Preparation of Electrolyte Solution

An electrolyte solution of the following chemical composition was prepared.

Pure water: 30 L

Silver nitrate: 10 g/L (in terms of silver ion concentration)

Ammonium sulfate: 100 g/L

Alkyl derivative of hydantoin: 0.6 g/L (2) Electrolysis

Electrolysis of the electrolyte solution was performed under the following conditions.

Anode: DSE electrode (manufactured by Permelec Electrode Ltd.)

Cathode: SUS316 plate

Distance between electrodes: 5 cm

Current density: 500 A/m$^2$

Circulation speed of electrolyte solution: 4.0 mL/(min·cm$^2$)

Liquid temperature of electrolyte solution: 25° C.

After electrolysis, the silver powder was washed with 5 L of pure water using a nutsche funnel. Next, 1 L of a 0.3% stearic acid solution in acetone was sprinkled on the silver powder for surface treatment. The resulting silver powder was then dried in a dryer.

Example 2

A silver powder was obtained in the same manner as in Example 1, except that the amount of alkyl derivative of hydantoin added was changed to 0.03 g/L.

Example 3

A silver powder was obtained in the same manner as in Example 1, except that the circulation speed of the electrolyte solution was changed to 2.0 mL/(min·cm$^2$).

Comparative Example 1

This comparative example corresponds to the example in US 2018/326478A1.
(1) Preparation of Electrolyte Solution
An electrolyte solution of the following chemical composition was prepared.
  Pure water: 30 L
  Silver nitrate: 20 g/L (concentration in terms of silver ion)
  Citric acid: 0.1 g/L
  Nitric acid: 10 g/L
(2) Electrolysis
Electrolysis of the electrolyte solution was performed under the following conditions.
  Anode: DSE electrode
  Cathode: SUS316 plate
  Distance between electrodes: 5 cm
  Current density: 750 A/m$^2$
  Circulation speed of electrolyte solution: 4.0 mL/(min·cm$^2$)
  Liquid temperature of electrolyte solution: 25° C.

The subsequent operations were conducted in the same manner as in Example 1 to obtain a silver powder.

Evaluation 1

Figure 1:
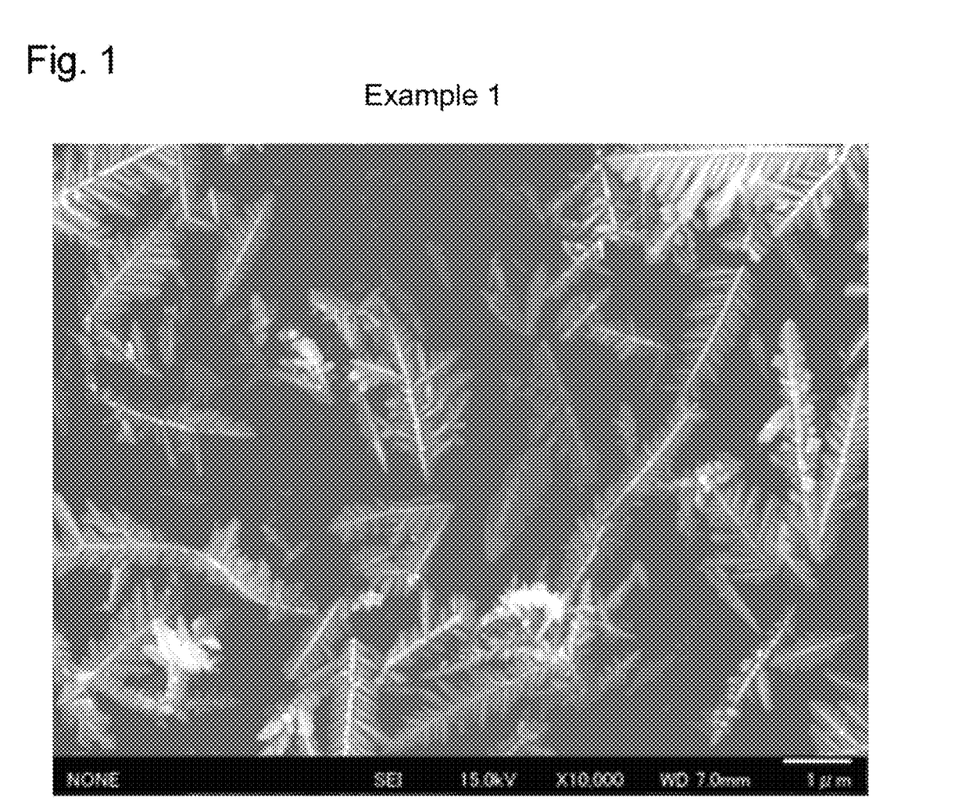
FIG. 1 is a scanning electron microscope image of a silver powder obtained in Example 1.
Figure 2:
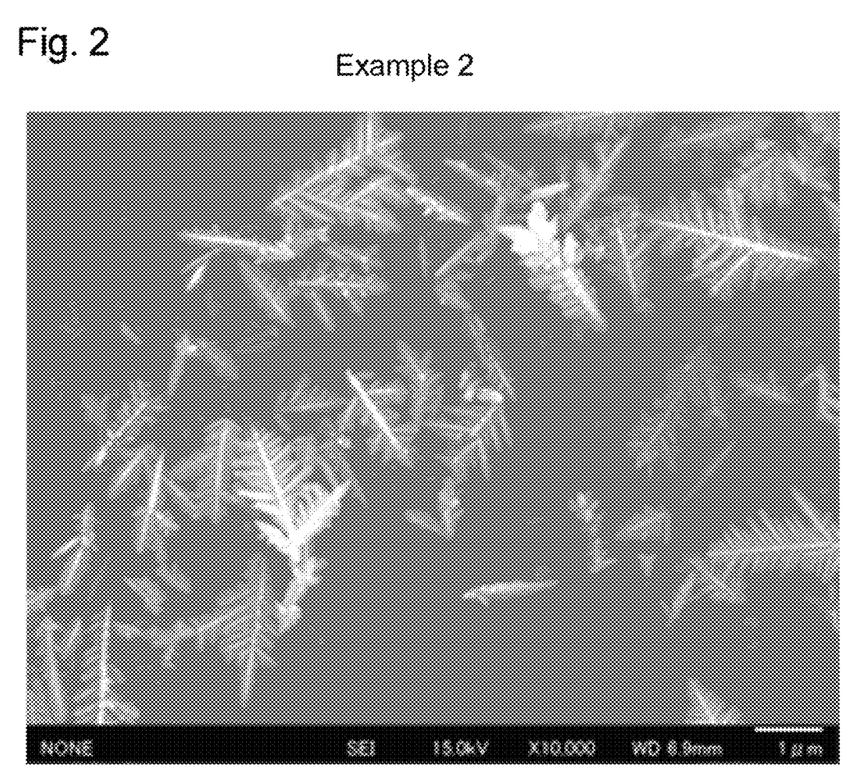
FIG. 2 is a scanning electron microscope image of a silver powder obtained in Example 2.
Figure 3:
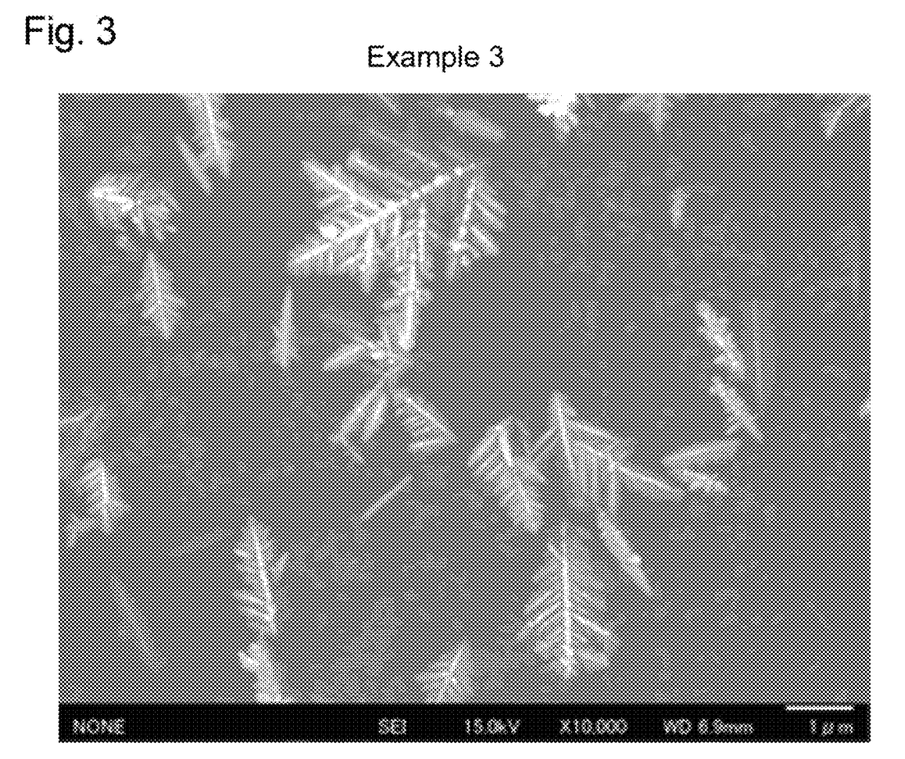
FIG. 3 is a scanning electron microscope image of a silver powder obtained in Example 3.
Figure 4:
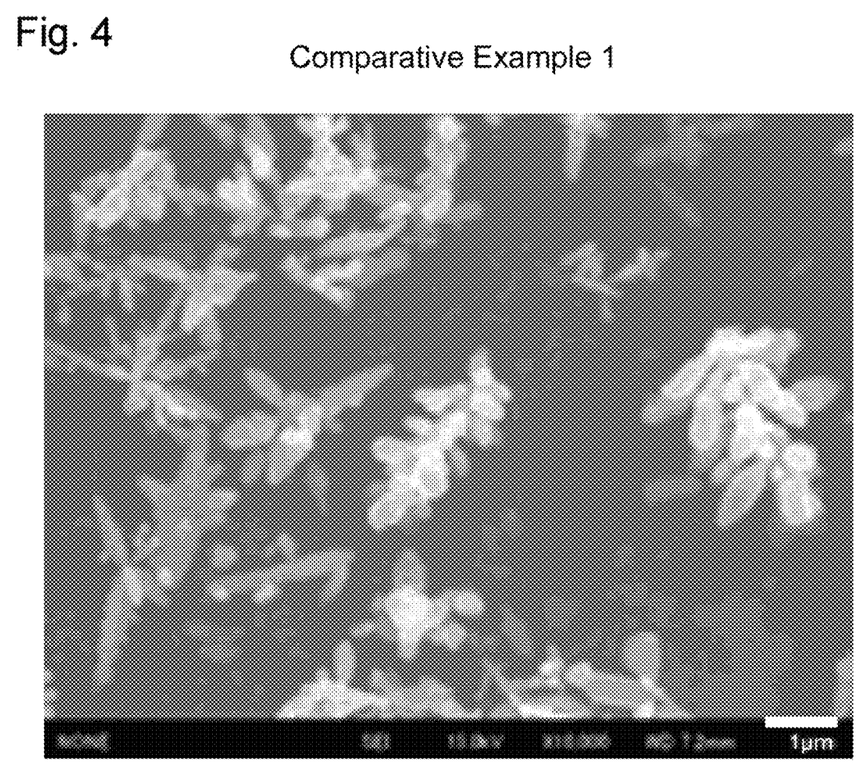
FIG. 4 is a scanning electron microscope image of a silver powder obtained in Comparative Example 1.

The silver powders obtained in Examples 1 to 3 were observed using a scanning electron microscope (SEM). FIG. 1 (Example 1), FIG. 2 (Example 2), FIG. 3 (Example 3), and FIG. 4 (Comparative Example 1) show the results. When there are aggregated powders and the like, the particles overlap each other, which results in difficulty in the determination of the dendrite shape. Therefore, the particles were classified in advance to remove aggregates. After sprinkling the silver powder on the sample table, air was blown to suppress overlapping of particles.

Evaluation 2

On each of the silver powders obtained in the examples, the thickness and the length of a trunk, the number of branches, and the length of the longest branch among the branches extending from the trunk of the dendrite silver particles were measured using the following method. The average angle between the trunk and the branches was also measured. Furthermore, the percentage (N %) of dendrite silver particles having a trunk with a thickness of 10 to 280 nm and also having 6 to 30 branches/μm length of the trunk was measured. Table 1 shows the results.

Thickness and Length of Trunk, Number of Branches, and Length of Longest Branch

Using a scanning electron microscope, 50 particles in total were observed in 15 fields of view at a magnification that enabled determination of the shape of the entire particle, specifically, at a magnification of 10,000× in this example. The thickness and the length of the trunk, the number of branches, and the length of the longest branch among the branches extending from the trunk of the particles were measured, and their average values were calculated.

Percentage (N %) of Dendrite Silver Particles

The number of dendrite silver particles that were found to have a trunk with a thickness of 10 to 280 nm and also have 6 to 30 branches/μm in the above-described method was counted, and the resulting number was divided by 50 and then multiplied by 100 to obtain the percentage (N %).

Average Angle Between Trunk and Branches

Using a scanning electron microscope, 50 particles in total were observed in 15 fields of view at a magnification of 10,000×. For each of the particles, the angle between the trunk and each branch on the acute side was measured, and average values of the respective particles were calculated.

Evaluation 3

The tap density, the apparent density, the BET specific surface area, and the particle size $D_{50}$ of the silver powders obtained in the examples were measured using the following method. Table 1 shows the results.

Tap Density

The tap density was measured using a JV2000 manufactured by Copley Scientific in accordance with JIS Z 2512. Specifically, 10 g of silver powder was put into a graduated cylinder with a capacity of 25 cm$^3$, and the measurement was performed at a tapping stroke of 3 mm and the number of taps of 2500 (250 taps/min).

Apparent Density

The apparent density was measured using a bulk density tester (model for metal powder: JIS-Z-2504, hole diameter of funnel 5.0 mm) manufactured by Kuramochikagaku Co., Ltd. in accordance with JIS Z 2504.

BET Specific Surface Area

The BET specific surface area was measured using Monosorb manufactured by Mountech Co., Ltd. by the BET single point method.

Particle Size $D_{50}$ 0.2 g of silver powder was put into a beaker, and 0.07 g of Triton X-100 (manufactured by Kanto Chemical Co., Inc.) was added and blended into the silver powder. Then, the silver powder was added to 40 mL of dispersant-containing water (dispersant: 0.3% SN-PW-43 solution (manufactured by San Nopco Limited)). To the resulting mixture, ultrasonic waves at 300 W were applied for 3 minutes using an ultrasonic homogenizer US-300AT (manufactured by Nippon Seiki Co., Ltd.) to disperse the mixture, thereby preparing a measurement sample. The particle size $D_{50}$ of this measurement sample in the volume-weighted particle size distribution was measured using a laser diffraction/scattering particle size distribution analyzer MT3300II (manufactured by Nikkiso Co., Ltd.).

Evaluation 4

The silver crystallite size, and the shrinkage rate at 150° C. and the shrinkage onset temperature of the silver powders obtained in the examples were measured using the following method. Table 1 shows the results.

Silver Crystallite Size

X-ray diffractometry was performed using an X-ray diffractometer RINT2000 manufactured by Rigaku Corporation. The diffraction peaks obtained were used to calculate the crystallite size by the Scherrer method. The conditions for X-ray diffractometry were as follows: 2θ/θ=5 to 80 deg, step width=0.01 deg, scan speed=0.2 deg/min, characteristic X-ray=Cu-Kα1 radiation, and 1D detector. The crystallite size was calculated from the width at half maximum of the Ag(200) peak, using 0.94 as the Scherrer constant.

Shrinkage Rate at 150° C. and Shrinkage Onset Temperature

TMA/SS6300 manufactured by Hitachi High-Tech Corporation was used as a thermo-mechanical analyzer. 0.5 g of silver powder was placed in a special metal fitting with an inner diameter of 3.8 mmφ, and a load of 1.0 kN was applied thereto to obtain a sample. This sample was mounted on the thermo-mechanical analyzer, and the temperature of the sample was increased under a load of 49 mN from 25° C. to 800° C. at a rate of 10° C./min in a mixed atmosphere of 99 vol % nitrogen and 1 vol % hydrogen. The coefficient of thermal expansion (%) was monitored over time from 25° C., and the absolute value of the negative coefficient of expansion at 150° C. was defined as the shrinkage rate at that temperature.

Figure 5:
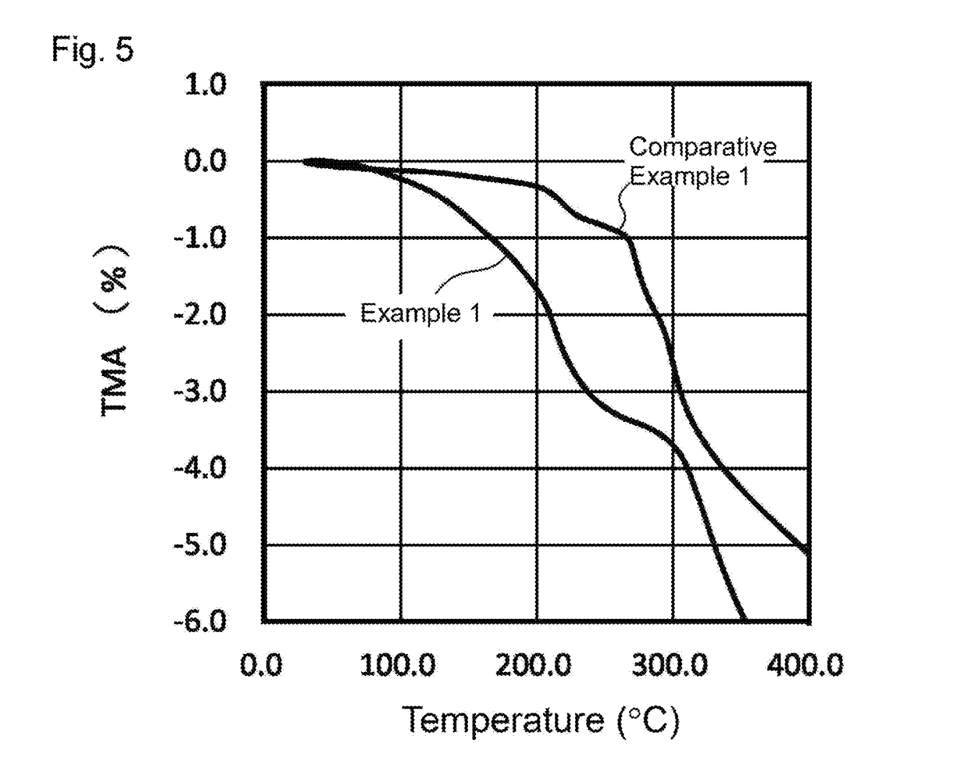
FIG. 5 is a graph showing measurement results of thermomechanical analysis obtained in Example 1 and Comparative Example 1.

Furthermore, the temperature at which the absolute value of the negative coefficient of expansion reached 0.3% was defined as the shrinkage onset temperature. FIG. 5 shows the measurement results of the thermo-mechanical analysis.

Evaluation 5

For each of the silver powders obtained in the examples, the silver powder was mixed with a resin to prepare a conductive resin composition, and the resistivity of a conductive film obtained from the conductive resin composition was measured. Table 1 shows the results.

Resistivity of Conductive Film

The silver powders obtained in the examples and comparative examples were used to prepare conductive resin compositions.

The silver powder, an epoxy resin, and 2-methylimidazole were mixed to prepare a conductive resin composition in the form of a paste. Three types of conductive resin compositions were prepared, each containing 30%, 50%, and 60% of the silver powder. The mass ratio of epoxy resin to 2-methylimidazole in each conductive resin composition was 97:3.

The pastes were then applied to a glass plate. A bar coater with a width of 200 mm was used for the application. The gap was set to 100 μm. The formed coating was dried in an atmospheric hot-air drying oven at 110° C. for 60 minutes to obtain a conductive film with a thickness of 80 μm. The resistance of the conductive film was measured using a resistivity meter (MCP-T600 manufactured by Mitsubishi Chemical Corporation) by the four probe method.

TABLE 1

|  |  | Ex. 1 | Ex. 2 | Ex. 3 | Com. Ex. 1 |
|---|---|---|---|---|---|
| Thickness of trunk (nm) (average) | | 101 | 160 | 65 | 287 |
| Length of trunk (μm) (average) | | 2.5 | 4.8 | 2.2 | 2.2 |
| Length of longest branch (μm) (average) | | 1.0 | 2.6 | 1.1 | 1.0 |
| Number of branches (branches/μm) (average) | | 15 | 9 | 22 | 4 |
| Angle of branch relative to trunk (average) | | 59 | 63 | 61 | 57 |
| N % of dendrite silver particles (*1) | | 81 | 72 | 83 | 17 |
| Tap density (g/cm$^3$) | | 0.6 | 0.9 | 0.5 | 1.9 |
| Apparent density (g/cm$^3$) | | 0.5 | 0.7 | 0.4 | 1.1 |
| BET specific surface area (m$^2$/g) | | 3.2 | 2.4 | 3.8 | 1.2 |
| Silver crystallite size (nm) | | 42 | 49 | 38 | 60 |
| Particle size D$_{50}$ (μm) | | 1.0 | 1.1 | 0.8 | 2.3 |
| Shrinkage rate at 150° C. (%) | | 0.75 | 0.46 | 0.81 | 0.19 |
| Resistivity of conductive film (Ω · cm) | Silver powder 30% | $1.6 \times 10^6$ | $8.4 \times 10^6$ | $4.2 \times 10^5$ | Not measurable |
| | Silver powder 50% | $2.2 \times 10^{-3}$ | $1.1 \times 10^{-2}$ | $2.4 \times 10^{-3}$ | Not measurable |
| | Silver powder 60% | $6.6 \times 10^{-4}$ | $5.6 \times 10^{-4}$ | $8.3 \times 10^{-4}$ | $9.9 \times 10^{-1}$ |

*1 The number of dendrite silver particles having a trunk with a thickness of 10 to 280 nm and having 6 to 30 branches/μm was counted.

From the results shown in Table 1, it is clearly seen that the silver powders of the examples have a thinner trunk and more branches of dendrite silver particles than those of the comparative example. Furthermore, in the images shown in FIGS. 1 to 3, sub-branches branching from the branches are observed.

Also, from the results shown in Table 1, it is clearly seen that the conductive films containing the silver powders of the examples have lower resistivity than those of the comparative example. It should be noted that the films containing the silver powders of the examples show conductivity even when the amount of silver powder added is as extremely small as 30%.

INDUSTRIAL APPLICABILITY

The silver powder of the present invention can impart high conductivity to a resin even when the amount of the silver powder added thereto is small. Furthermore, by the production method of the present invention, it is easy to produce such a silver powder.

The invention claimed is:

1. A silver powder comprising silver particles including dendrite silver particles, each of the dendrite silver particles being in a dendrite shape having only a single trunk and a plurality of branches branching from the single trunk,
    wherein a thickness of the single trunk is from 10 to 280 nm, and a length of the single trunk is from 0.5 to 10.0 μm,
    the number of the plurality of branches per length of the single trunk is from 6 to 30 branches/μm,
    the plurality of branches directly branch from the single trunk, and
    the percentage by number of the dendrite silver particles in the whole of the silver particles is 50 N % or more,
    the silver powder has a shrinkage rate of 0.3% or more, and the shrinkage rate is defined under the following conditions:
        0.5 g of the silver powder is placed in a measurement fitting, to which a first load is applied, to obtain a sample;
        the sample is disposed on a thermo-mechanical analyzer, and a temperature of the sample is increased under a second load from 25° C. to 800° C. at a rate of 10° C./min in a mixed atmosphere of nitrogen and hydrogen; and
        an absolute value of a negative coefficient of expansion at 150° C. is defined as the shrinkage rate, and
    the silver powder has a crystallite size of from 10 to 49 nm.

2. The silver powder according to claim 1, having a tap density of 1.0 g/cm$^3$ or less.

3. The silver powder according to claim 1,
    wherein the silver powder has the crystallite size of from 10 to 46 nm.

4. The silver powder according to claim 1,
    wherein the shrinkage rate of 0.5% or more.

5. The silver powder according to claim 1, wherein an average angle between the single trunk and each of the plurality of branches is from 45 to 80 degrees.

6. The silver powder according to claim 1,
    wherein the dendrite shape further has a plurality of sub-branches branching from one of the plurality of branches.

7. A conductive resin composition comprising a resin and the silver powder according to claim 1.

8. The silver powder according to claim 1,
wherein the silver powder has the crystallite size of from 30 to 42 nm.

9. The silver powder according to claim 1,
wherein the shrinkage rate of 0.7% or more.

* * * * *